United States Patent [19]

Fromion

[11] Patent Number: 5,663,660
[45] Date of Patent: Sep. 2, 1997

[54] DEVICE FOR MATCHING A LINE INTERFACE OF A STATION LINKED TO A MULTIPLEXED-INFORMATION TRANSMISSION NETWORK

[75] Inventor: Alexandre Fromion, Antony, France

[73] Assignees: Automobiles Peugeot, Paris; Automobiles Citroen, Neuilly sur Seine, both of France

[21] Appl. No.: 556,096

[22] Filed: Nov. 9, 1995

[30] Foreign Application Priority Data

Nov. 9, 1994 [FR] France .................. 94 13480

[51] Int. Cl.[6] ................... H03K 17/16; H03K 19/003
[52] U.S. Cl. ................... 326/30; 333/32; 375/257
[58] Field of Search ................... 326/30; 333/32; 375/257

[56] References Cited

U.S. PATENT DOCUMENTS

| | | | |
|---|---|---|---|
| 4,084,069 | 4/1978 | Looschen | 375/257 |
| 4,112,253 | 9/1978 | Wilhelm | 375/257 |
| 4,994,690 | 2/1991 | Sundstrom et al. | |
| 5,220,211 | 6/1993 | Christopher et al. | 326/30 |
| 5,528,168 | 6/1996 | Kleveland | 326/30 |
| 5,568,063 | 10/1996 | Takekuma et al. | 326/86 |

FOREIGN PATENT DOCUMENTS 0 457 595  11/1991  European Pat. Off. .

Primary Examiner—Edward P. Westin
Assistant Examiner—Richard Roseen
Attorney, Agent, or Firm—Burns, Doane, Swecker & Mathis, L.L.P.

[57] ABSTRACT

This device in which the network includes a transmission cable (4) fitted with a pair of conductors (2, 3), is characterized in that each conductor (2, 3) of the cable is linked at each of its ends to a terminal of a resistor (9, 10) whose value is equal to half the value of the characteristic impedance of the cable (4) and the other terminal of which is linked to a voltage source (11, 12).

3 Claims, 1 Drawing Sheet

DEVICE FOR MATCHING A LINE INTERFACE OF A STATION LINKED TO A MULTIPLEXED-INFORMATION TRANSMISSION NETWORK

The present invention relates to a device for matching a line interface of a station linked to a multiplexed-information transmission network.

The invention can indeed be applied to multiplexed-information transmission networks which implement a communication standard of VAN or CAN type or more generally to networks which use bit-by-bit arbitration as the method of access to the communication medium.

The communication standards alluded to above define very precisely the structure of the standard physical line interfaces which may be used.

These are very well suited to the constraints of applications of multiplexed-information transmission inside motor vehicles.

However, for industrial applications, or in any event ones in which the transmission distances are large, that is to say for example greater than ten meters, it is necessary to use another physical interface for matching.

Thus, for example, in this type of application it is possible to use RS485 type interface components associated with an information transmission cable fitted with a pair of twisted and possibly shielded conductors.

However, this structure should preserve all of the functionalities of the communication protocol.

This remark translates into two consequences for the use of components which are compatible with the RS485 standard, and in particular line interfaces:

1. the line interface should be driven so as to produce the two bus states, that is to say the recessive state and the dominant state, the dominant state being characterized through the fact that it sets the electrical state of the cable and the recessive state being characterized through the fact that it can be overridden by a dominant state simultaneously present on the cable; and 2. the transmission cable, because of its length, has to be impedance-matched.

The aim of the invention is therefore to resolve these problems in a simple and reliable manner.

For this purpose, the subject of the invention is a device for matching a line interface of a station linked to a multiplexed-information transmission network, including a transmission cable, fitted with a pair of conductors, and characterized in that each conductor of the cable is linked at each of its ends to a terminal of a resistor whose value is substantially to half the value of the characteristic impedance of the cable and the other terminal of which is linked to a voltage source.

Advantageously, the output voltage from each source is equal to the voltage of the terminal of the interface linked to the same conductor of the cable, when this interface is active.

The invention will be better understood with the aid of the description which follows, given merely by way of example and provided with reference to the attached drawings in which.

Figure 1:
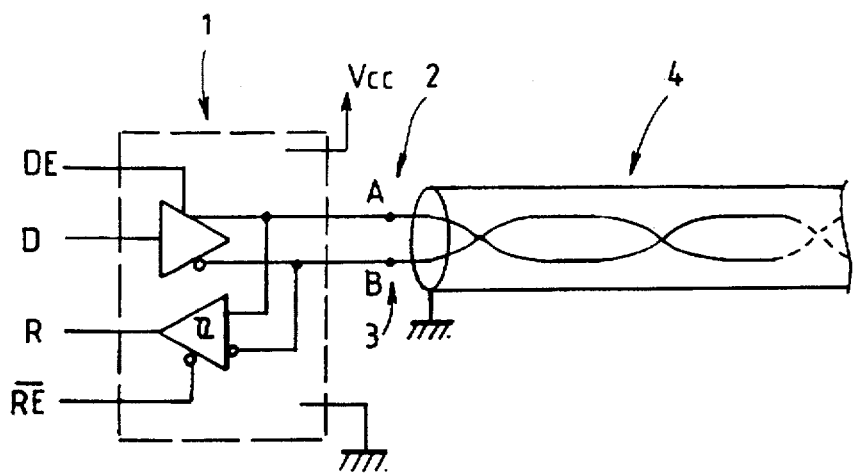
FIG. 1 represents a diagrammatic layout of a conventional line interface.

Represented in FIG. 1 is a diagrammatic layout of a conventional RS485 line interface denoted by the general reference 1, and linked to the conductors 2 and 3 of a cable 4 for transmitting multiplexed information.

This multiplexed-information transmission cable allows the linking of several stations for example, and includes two twisted and possibly shielded conductors.

Such an interface is characterized by two differential terminals connected to the conductors 2 and 3 at A and B of the cable, a logic input DE (DATA ENABLE) for enabling the active or high-impedance output stage, a logic input D for controlling the differential output stage ($V_A > V_B$ or $V_B > V_A$), a logic input not RE (RECEIVE ENABLE) for enabling the integrated receiver and a logic output R, dependent on the voltages present on the conductors of the cable.

The truth tables illustrating the operation of this interface are given below.

| Truth table for the sender. | | | |
|---|---|---|---|
| Input D | Input DE | Output A | Output B |
| High | High | Vh | Vb |
| Low | High | Vb | Vh |
| X | Low | H. Imp. | H. Imp |

High: output level for a logic "1"
Low: output level for a logic "0"
H. Imp: high impedance
Vh: output voltage at the high level (≈3 V)
Vb: output voltage at the low level (≈1 V)
X: irrelevant

| Truth table for the receiver | | |
|---|---|---|
| Differential inputs A–B | Input Re | Output R |
| >0.2 V | Low | High |
| <0.2 V | Low | Low |
| X | High | H. Imp |

High: output level for a logic "1"
Low: output level for a logic "0"
H. Imp: high impedance
X: irrelevant The operation of the line interface is therefore as follows:

When this line interface is asked to send a recessive level, it places its output stage at high impedance, whereas if it is asked to send a dominant level, it places its output stage in the active state and sets B>A (D="0").

This mode of operation properly guarantees correct bit-by-bit arbitration.

However, when the network is idle, all the line interfaces are in a state of high impedance and the electrical level on the cable is no longer guaranteed.

It is therefore necessary to set an electrical level on this cable allowing the receiver to supply the logic information item "recessive level on the cable".

This information item allows a protocol manager of the station to ascertain whether the bus is free or busy.

Figure 2:
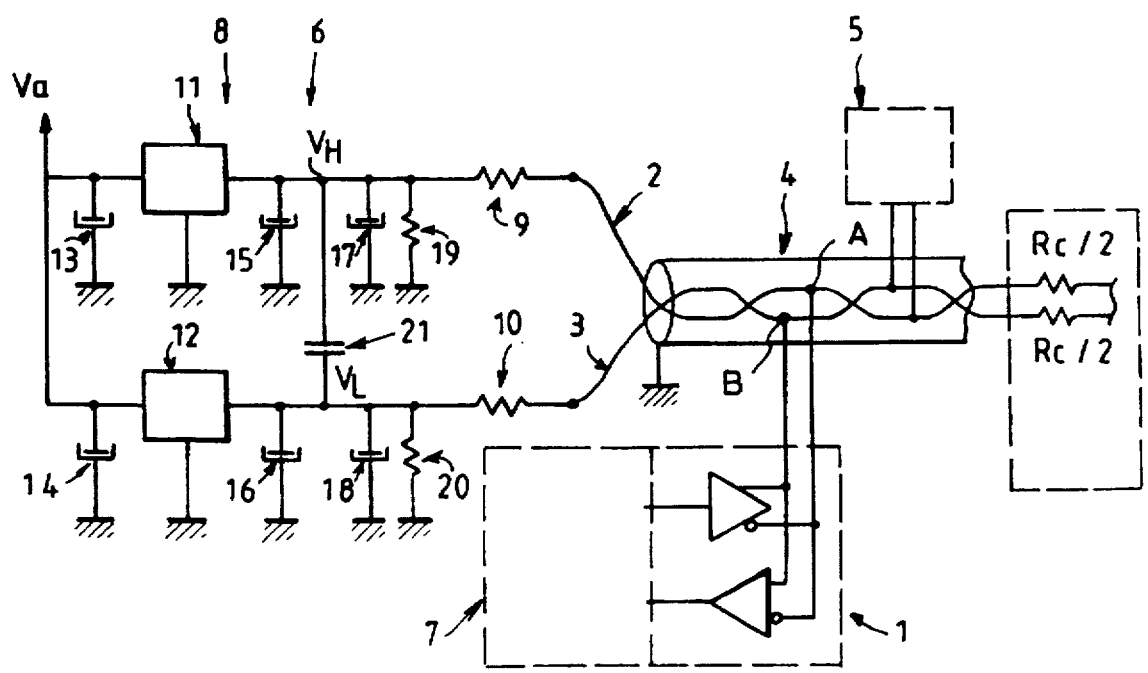
FIG. 2 represents a diagrammatic layout illustrating the structure of a line interface matching device according to the invention.

A structure which allows this to be done is illustrated in FIG. 2, in which are recognized the information transmission cable 4 allowing the linking of stations 5 and 6 for example, the station 6 including an interface 1 such as described earlier linked to a protocol manager 7.

Moreover, means denoted by the general reference 8 are provided which allow the cable to be matched, that is to say to close the latter off into its characteristic impedance (Rc) at each end.

This impedance of the cable depends on the latter's inherent characteristics, that is to say on its inductance per unit length, on its distributed capacitance, etc.

There is therefore cause to effect a function of impedance matching and retention of a well-defined electrical level on the cable.

For this purpose, a resistor whose value is equal to half the value of the characteristic impedance Rc of the cable is connected up to each end of this cable and onto each conductor of the twisted pair of the latter, this resistor also being connected to a voltage source consisting for example of a linear regulator.

In order to optimize the noise margin at receiver level, the voltage sources used will take on the value of the voltage of the interface when the latter is active.

Thus, for example, in this FIG. 2 each conductor 2 or 3 of this cable 4 is linked at each of its ends to a terminal of a resistor for example 9, 10, whose value is substantially equal to half the value of the characteristic impedance (Rc) of the cable and the other terminal of which is linked to a voltage source 11, 12.

These voltage sources are connected to a supply voltage Va and various decoupling capacitors 13, 14, 15, 15, 17 and 18 are used.

Moreover, resistors 19 and 20 are also used to fix their minimum output load.

The voltage sources 11 and 12 may consist of regulators of linear type, whose outputs are associated with a decoupling capacitor 21 connected up between the output terminals $V_H$ and $V_L$ respectively of these sources.

As indicated earlier, the output voltage from each voltage source can be equal to the voltage of the terminal of the interface linked to the same conductor of the cable, when this interface is active, that is to say when $V_H=V_A$ and $V_L=V_B$ (active).

It is thus appreciated that this device offers a number of advantages insofar as it may be matched to all types of bus network based on bit-by-bit arbitration.

Moreover, it allows the use of industry-standard components and makes it possible to obtain high reliability of transmissions.

It is also possible to use it on very long networks whilst still retaining the functionalities of the protocols with bit-by-bit arbitration and in particular the VAN protocol and to do so for a small cost.

Moreover, the transition time between a dominant state and a recessive state is very small since the time constant fixed by the capacitance of the cable and the pull-down resistance (Rc/2) is very small, this allowing transmissions at very high bit rate over very long distances.

By virtue of an automatic diagnostic unit integrated into the VAN components, it is also possible to produce secure links by connecting two line interfaces up to the VAN component for protocol management, the diagnostic unit automatically choosing the right input or inputs.

It is appreciated that this device may find applications in robotics, in the railway sector and more generally in the industrial sector.

I claim:

1. Device for matching a line interface of a station linked to a multiplexed-information transmission network, including a transmission cable, fitted with a pair of conductors, wherein each conductor of the cable is linked at each of its ends to a terminal of a resistor whose value is substantially equal to half the value of the characteristic impedance of the cable and the other terminal of the resistor is linked to a voltage source.

2. Matching device according to claim 1, wherein an output voltage from each source is equal to a voltage of a terminal of the interface linked to the same conductor of the cable, when this interface is active.

3. Matching device according to claim 1, wherein each voltage source includes a linear regulator.

* * * * *